Dec. 22, 1953  A. M. EL SHAYEB  2,663,317
MIXING VALVE FAUCET
Filed Dec. 2, 1949
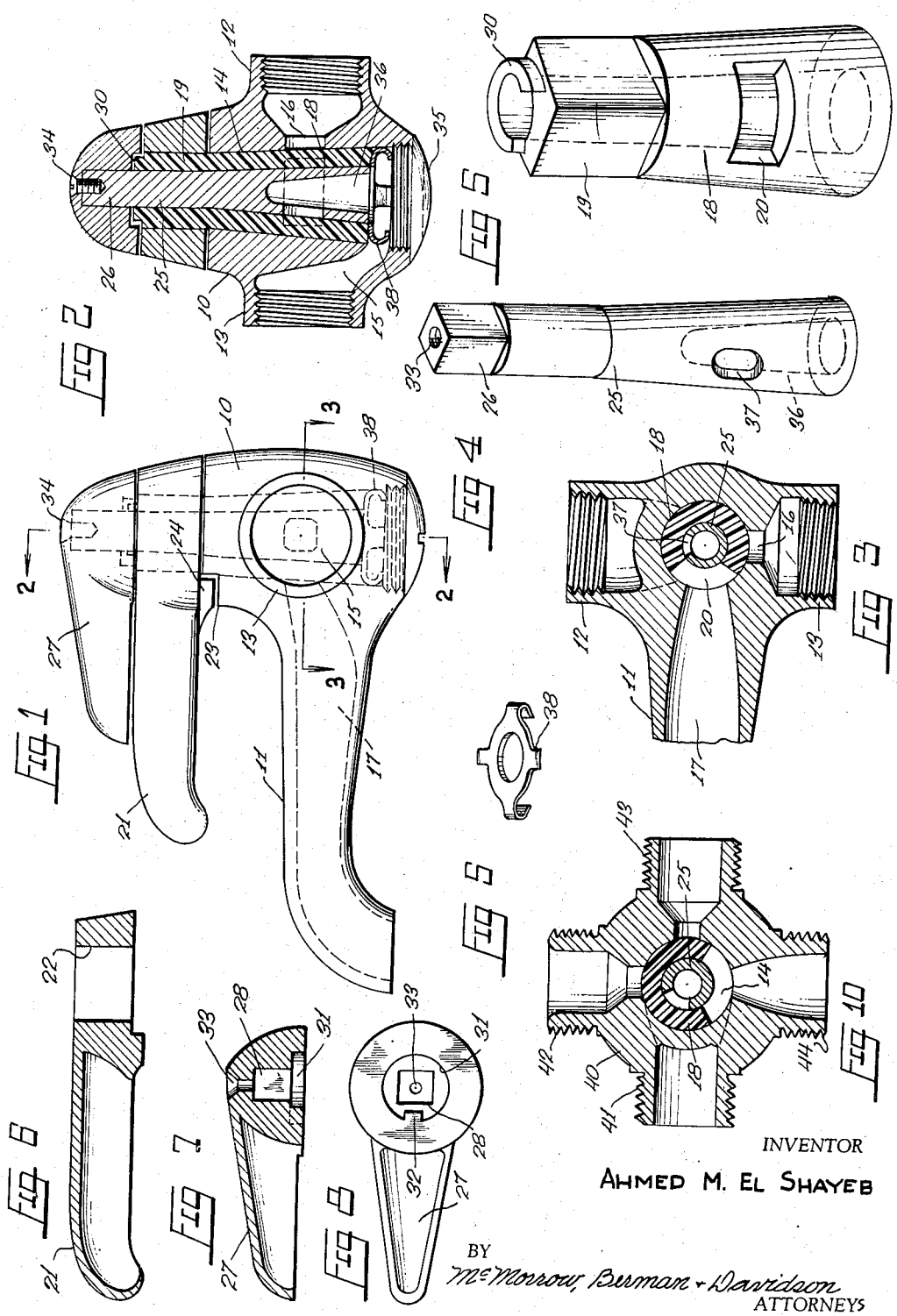
INVENTOR
AHMED M. EL SHAYEB
BY
McMorrow, Berman + Davidson
ATTORNEYS Patented Dec. 22, 1953

2,663,317

UNITED STATES PATENT OFFICE 2,663,317

MIXING VALVE FAUCET

Ahmed M. El Shayeb, Cairo, Egypt

Application December 2, 1949, Serial No. 130,739

2 Claims. (Cl. 137—637.3)

This invention relates to plumbing valves such as water faucets, and more particularly to a faucet having a valve for mixing fluids, such as hot and cold water.

It is among the objects of the invention to provide an improved faucet having a hollow valve body and valve plugs rotatable in the body wherein the body and plugs are complementarily tapered and the plugs are held in tight seating relationship in the body by the pressure of fluid in the fluid supply line to which the faucet is connected, wherein coaxial rotatable valve plugs in a single valve body are effective to control the flow of two fluids, such as hot and cold water, from the faucet, wherein the relatively movable parts of the faucet have surface contact between metallic and non-metallic materials only, and which faucet is simple and durable in construction, economical to manufacture, and easy to install and operate.

Other objects and advantages will become apparent from a consideration of the following description and the appended claims in conjunction with the accompanying drawing wherein:

Figure 1 is a side elevation of a plumbing faucet illustrative of the invention;

Figure 2 is a cross section on the line 2—2 of Figure 1;

Figure 3 is a cross section on the line 3—3 of Figure 1;

Figure 4 is a perspective view of an inner valve plug constituting an operative component of the faucet;

Figure 5 is a perspective view of an outer valve plug constituting another operative component of the faucet;

Figure 6 is an elevation of the handle for the outer valve plug, a portion being broken away and shown in cross section to better illustrate the construction thereof;

Figure 7 is an elevation of the handle for the inner valve plug, a portion being broken away and shown in cross section to better illustrate the construction thereof;

Figure 8 is a bottom plan view of the handle illustrated in Figure 7;

Figure 9 is a perspective view of a flat spring constituting an operative component of the faucet; and Figure 10 is a transverse cross section of a modified form of faucet.

With continued reference to the drawing, the form of the invention illustrated in Figures 1 to 9 inclusive discloses a faucet for use on a wash basin, sink, laundry tub or bathtub, and comprises a valve body 10 of metallic material, such as steel or brass, having a spout 11 extending from one side thereof, and two internally screw threaded pipe fittings 12 and 13 extending from respectively opposite sides of the body and both disposed substantially at right angles to the spout 11 for connecting hot and cold water pipes to the valve body of the faucet. The body 10 is provided with a tapered bore 14 extending from one end of the body to the other between the pipe fittings 12 and 13 and past the spout 11.

A fluid passage 15 leads from the pipe fitting 13 into the bore 14 near the larger end of the bore, and a fluid passage 16 leads from the pipe fitting 12 into the bore at a location intermediate the length of the bore. A fluid outlet passage 17 leads through the spout 11 from the bore 14 at a location adjacent the fluid passage 16 and at substantially the same distance as the passage 16 from the larger end of the bore.

A tubular outer valve plug 18 is rotatably mounted in the bore 14 of the valve body, and has an external taper corresponding to the taper of the bore. This plug terminates short of the larger end of the bore and has a portion 19 of square or other noncircular cross sectional shape projecting from the valve body at the smaller end of the bore 14. This tubular outer valve plug is provided intermediate its length with an elongated, rectangular aperture 20 which is positioned to register with the fluid inlet passage 16 and the fluid outlet passage 17 and to interconnect these fluid passages when the outer valve plug is rotated to an "on" position in which the aperture 20 registers at least partially, with both the inlet passage 16 and the outlet passage 17.

A handle 21 has at one end a noncircular recess opening 22 which receives the noncircular portion 19 of the outer valve plug for rotating this outer valve plug in the valve body.

At the smaller end of the bore 14 and substantially symmetrical with the location of the spout 11, the valve body is provided with an arcuate recess 23, and the handle 21 is provided with a projection 24 which is received in the recess 23. The recess provides stop shoulders at its opposite ends which contact the projection 24 and limit the rotational movements of the handle 21 to the angular interval occupied by the arcuate recess to thereby predetermine the angular interval through which the outer valve plug 18 is rotatable in the valve body 10 between the "on" and "off" positions of the valve plug.

An inner valve plug 25, preferably formed of a metallic material, is rotatably mounted in the outer valve plug 18, and has an external taper which corresponds to the internal taper of the outer valve plug. The inner valve plug 25 terminates at its larger end substantially flush with the larger end of the outer plug 18, and has a portion 26 of noncircular cross sectional shape projecting outwardly of the smaller end of the outer plug. A handle 27 has, at one end, a recess 28 of noncircular shape which receives the noncircular portion 26 of the inner plug 25 for rotating the inner plug. The outer plug is provided on the outer end of its noncircular portion 19 with a discontinuous boss 30 of generally circular shape, and the handle 27 is provided at one end of the recess 28 with an enlargement of the recess 28 or counterbore 31 which receives the boss 30. A projection 32 extends inwardly of the counterbore 31 and is positioned within the discontinuity of the boss 30 and between the ends of the latter, so that rotational movements of the handle 27 relative to the outer valve plug 18 are limited to the angular interval between the ends of this boss. This construction limits rotational movements of the inner valve plug relative to the outer valve plug between the "on" and "off" positions of the inner valve plug. At its end opposite the counterbore 31, the recess 28 is restricted to a screw hole 33 and a screw 34 extended through this hole and threaded into a screw threaded well in the end of the portion 26 of the inner valve plug 25 secures the handle 27 on the inner valve plug 25 against accidental removal therefrom.

The bore 14 is internally screw threaded at its larger end, and a screw plug 35 is threaded into and closes this larger end of the bore. The inner side of this screw plug is spaced from the larger ends of the plugs 18 and 25, and the fluid passage 15 leads into the space between the screw plug 35 and the larger ends of the valve plugs. The inner valve plug 25 is provided with a cavity 36 which extends inwardly from the larger end of this plug longitudinally of the plug to a location somewhat beyond the location of the aperture 20 in the outer plug 18. A rounded aperture 37 in the inner plug 25 leads from the inner end of the cavity to the exterior of the inner plug and into the aperture 20 in the outer plug when the inner plug is in position rotationally of the outer plug, such that the aperture 37 registers, at least partially, with the aperture 20.

A plate spring 38 is disposed between the inner side of the screw plug 35 and the larger ends of the valve plugs 18 and 25 to assist in maintaining these valve plugs in firmly seated position and to hold the valve plugs in properly seated position in the event of loss of fluid pressure in the passage 15. This plate spring 38 is so constructed that it does not materially obstruct the flow of fluid from the fluid passage 15 into the cavity 36 of the inner valve plug.

In the operation of this valve, assuming that the passage 15 is the cold water passage, and the passage 16, the hot water passage, if the outer valve plug 18 is positioned, as illustrated in Figure 3, so that its aperture 20 is in registry with the outlet passage 17, but out of registry with the hot water inlet passage 16, if the inner valve plug 25 be now rotated without rotating the outer valve plug until the aperture 37 of the inner plug is brought into partial registry with the aperture 20 in the outer plug, a small flow of cold water will flow from the passage 15 through the cavity 36 in the inner plug, through the apertures 37 and 20 and through the outlet passage 17. If it is now desired to add hot water to the cold water the outer plug 18 is rotated until the aperture 20 is brought, at least partially, into registry with the hot water passage 16 while remaining in registry with the outlet passage 17. This will admit a controlled amount of hot water to the outlet passage in addition to the cold water as previously described. If it is desired to cut off the cold water the inner plug 25 is rotated relative to the outer plug 18 until the aperture 37 is brought out of registry with the aperture 20.

The modified valve body 40, illustrated in cross section in Figure 10, is for use in a situation such as that wherein it is desired to supply water to a bathtub and a shower head through the same valve. This valve body is of cruciform shape having four pipe fittings 41, 42, 43 and 44 successively disposed at angular intervals of approximately 90-degrees. These pipe fittings may be internally screw threaded, as illustrated in Figures 2 and 3, or may be externally screw threaded, as illustrated in Figure 10, to receive flanged couplings for connecting pipes to the fitting. The fitting 41 is the cold water fitting, the fitting 43, the hot water fitting, the fitting 44 the outlet spout to the tub, and the fitting 42 the outlet to the pipe connecting the valve to the shower head. The tapered bore 14 is centered relative to the various passages, and the outer and inner valve plugs 18 and 25 are rotatably mounted in the bore 14 and operate in the same manner as that described above. The only difference between the operation of the modified form of valve shown in Figure 10 and the valve shown in Figures 1 to 9 inclusive is that, when it is desired to supply the water through the tub spout fitting 44 both valve handles are disposed in a generally downwardly extending position, while, when it is desired to supply water through the fitting 42 connected to the shower head, both valve handles are disposed in a generally upwardly extending position. The valve handles may be operated from either the upwardly or downwardly extending positions to control the flow of hot and cold water in the manner described above. In the case of the modified form of the valve illustrated in Figure 10, the recess 23 is extended so that the valve handles can be moved to either of the two operative positions disposed substantially 180-degrees apart and operated in either of these operative positions to control the flow of hot and cold water through the valve.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a mixing faucet, a valve body having first and second ends and an axial bore extending through said ends, said bore tapering from said first end to said second end, said valve body being formed with fluid inlet passages disposed radially with respect to the axis of said bore and circumferentially spaced from each other, one of said inlet passages entering said bore at the larger end of the bore and another of said inlet passages entering said bore at a point intermediate the ends of the bore, closure means closing the larger end of said bore, said body being further formed with an outlet passage leading from said bore at a point substantially in alignment with said other inlet passages, a tubular rotatable outer valve plug having a tapered outer surface conforming to and engaging the tapered surface of said bore, said outer valve plug having a larger end in axially spaced relation to said closure means and having a smaller end projecting axially beyond said first end of the bore, the side wall of said outer plug being formed with a port of sufficient circumferential extent to be registrable with said outlet passage and with one of said inlet passages in different rotary positions of said outer valve plug, said outer plug having a closed position in which said port is out of registry with said inlet passage, said outer plug having an axial bore extending therethrough substantially conforming in taper to the bore of said valve body, an inner rotatable valve plug, the outer surface of said inner plug being tapered to conformably engage the bore of said outer plug, said inner plug having a larger end substantially flush with the larger end of the outer plug and a smaller end projecting axially beyond the smaller end of said outer plug, said inner plug being formed with an axial passage extending through its larger end and opening into the space in the valve body bore between the larger end of the outer plug and said closure means, one of said inlet passages communicating with said space, the axial passage of the inner plug terminating in a port opening through the side of the inner plug in a position to register with the other inlet passage in a rotated position of said inner plug, a first handle secured on the smaller end of the outer plug, and a second handle secured on the smaller end of the inner plug and overlying said first handle.

2. In a mixing faucet, a valve body having first and second ends and an axial bore extending through said ends, said bore tapering from said first end to said second end, said valve body being formed with fluid inlet passages disposed radially with respect to the axis of said bore and circumferentially spaced from each other, one of said inlet passages entering said bore at the larger end of the bore and another of said inlet passages entering said bore at a point intermediate the ends of the bore, closure means closing the larger end of said bore, said body being further formed with an outlet passage leading from said bore at a point substantially in alignment with said other inlet passages, a tubular rotatable outer valve plug having a tapered outer surface conforming to and engaging the tapered surface of said bore, said outer valve plug having a larger end in axially spaced relation to said closure means and having a smaller end projecting axially beyond said first end of the bore, the side wall of said outer plug being formed with a port of sufficient circumferential extent to be registrable with said outlet passage and with one of said inlet passages in different rotary positions of said outer valve plug, said outer plug having a closed position in which said port is out of registry with said inlet passage, said outer plug having an axial bore extending therethrough substantially conforming in taper to the bore of said valve body, an inner rotatable valve plug, the outer surface of said inner plug being tapered to conformably engage the bore of said outer plug, said inner plug having a larger end substantially flush with the larger end of the outer plug and a smaller end projecting axially beyond the smaller end of said outer plug, said inner plug being formed with an axial passage extending through its larger end and opening into the space in the valve body bore between the larger end of the outer plug and said closure means, one of said inlet passages communicating with said space, the axial passage of the inner plug terminating in a port opening through the side of the inner plug in a position to register with the other inlet passage in a rotated position of said inner plug, a first handle secured on the smaller end of the outer plug, and a second handle secured on the smaller end of the inner plug and overlying said first handle, a removable closure closing the larger end of the valve body bore, and spring means compressed between the larger ends of both the outer plug and the inner plug and said closure means.

AHMED M. EL SHAYEB.

References Cited in the file of this patent
UNITED STATES PATENTS

| Number | Name | Date |
|---|---|---|
| 466,433 | Shartt | Jan. 5, 1892 |
| 951,378 | Neal | Mar. 8, 1910 |
| 1,181,662 | Hartman et al. | May 2, 1916 |
| 1,354,522 | Takala | Oct. 5, 1920 |
| 1,504,498 | Petcher | Aug. 12, 1924 |
| 1,642,623 | Niven | Sept. 13, 1927 |